(12) United States Patent
Gerhan et al.

(10) Patent No.: US 7,991,039 B2
(45) Date of Patent: Aug. 2, 2011

(54) ELECTRIC ARC FURNACE MONITORING SYSTEM AND METHOD

(75) Inventors: Ronald E. Gerhan, Avon Lake, OH (US); Nicolas Lugo, Clarksville, TN (US); Dave A. Lehr, Franklin, TN (US); Fernando Martinez Garcia, Garza Garcia (MX)

(73) Assignee: GrafTech International Holdings Inc., Parma, OH (US)

( * ) Notice: Subject to any disclaimer, the term of this patent is extended or adjusted under 35 U.S.C. 154(b) by 456 days.

(21) Appl. No.: 10/999,374

(22) Filed: Nov. 30, 2004

(65) Prior Publication Data

US 2006/0114963 A1 Jun. 1, 2006

(51) Int. Cl.
*H05B 7/18* (2006.01)
(52) U.S. Cl. ............... 373/102; 373/104; 373/60
(58) Field of Classification Search .......... 373/104–106, 373/102, 94, 50, 47, 49, 108, 70; 324/127, 324/140 R, 99 R, 529, 112, 114, 103 R
See application file for complete search history.

(56) References Cited

U.S. PATENT DOCUMENTS

| | | | |
|---|---|---|---|
| 4,283,678 A * | 8/1981 | Halter | 324/140 R |
| 5,099,438 A | 3/1992 | Gulden, Jr. et al. | 364/550 |
| 5,539,768 A | 7/1996 | Kracich | 364/550 |
| 6,552,525 B2 * | 4/2003 | Bessler | 324/103 R |
| 2005/0154611 A1 | 7/2005 | Beeler et al. | |

* cited by examiner

*Primary Examiner* — Quang T Van
(74) *Attorney, Agent, or Firm* — Waddey & Patterson, P.C.; James R. Cartiglia

(57) ABSTRACT

A system and method for monitoring the operating parameters of an electric arc furnace having a primary electrical circuit comprising a primary current transformer. The method includes monitoring the furnace's primary current transformer; collecting data therefrom; transmitting the collected data to a server having an operatively connected monitor; and displaying the collected data on the monitor in substantially real-time. The server also collects information about the performance of the furnace from a programmable logic computer and information entered manually by an operator at a furnace monitoring viewer system, which may also be displayed in substantially real-time on the monitor.

4 Claims, 2 Drawing Sheets

ELECTRIC ARC FURNACE MONITORING SYSTEM AND METHOD

BACKGROUND OF THE INVENTION

1. Technical Field

The present invention relates to electric arc furnaces (EAFs) and more specifically, to a monitoring system and method therefore that provides substantially real-time data about the operation of the electric arc furnace to a local user and which is transmitted over a global computer network to a remote secured database, from which historical reports may be generated as desired.

2. Background Art

In the steel industry, electric arc furnaces (EAFs) are used to melt metals and other ingredients to form steel. The heat needed to melt the metals is generated by passing current through one or more carbon bodies, commonly referred to as graphite electrodes, and forming an arc between the electrode(s) and the metals in the furnace.

In conventionally operated EAFs, the operator periodically collects raw data about different operational aspects of the furnace, such as operating electrical current levels, cumulative oxygen used, temperature of the molten steel, etc.

This raw data is typically stored on a local programmable logic computer (PLC) and accumulates quickly. The raw data is collected at a faster rate than the operator can review and assess it. Sometimes, the raw data is printed out. At the time the operator starts his or her review of the data, the data is often out-dated, leaving the operator only the ability to prepare reports based on the historical operation of the furnace. As a result, although the operator has access to lots of information, it is not as useful to him or her as it could be since it does not allow the operator to view the data in substantially real-time so as to adjust the furnace operation in an effort to maximize the furnace's performance and, for example, minimize electrode consumption.

U.S. Pat. No. 5,539,768 to Kracich (the '768 patent) discloses an electric arc furnace electrode consumption analyzer. In known electric arc furnaces, the furnace includes at least one electrode projecting into a furnace for containing a charge to be heated and an electrode support structure for moving the electrode toward and away from the charge. Specifically, the '768 patent teaches the use of a sensor for detecting the position of electrode support structure from an initial position. A processor calculates the travel distance and the rate of electrode consumption and triggers an alarm at certain predetermined operational parameters. While this device is useful to improve electrode performance because it provides substantially real-time data that the operator may use to make decisions about the furnace operation, it is disadvantageous because it limits the operator's decision based on travel distance alone, when electrode consumption is generally a function of many variables.

U.S. Pat. No. 5,099,438 to Gulden, Jr. et al. teaches the use of a method for "on-line" monitoring and control of the performance of an electric arc furnace. Here, the term "on-line" does not refer to any global computer network, but rather is used as a synonym for "direct." The '438 patent teaches that for many years, electric arc furnaces have been operated by manually controlled relay panels, which over time have been replaced by programmable logic controllers. The '438 patent teaches the integration of the PLCs and microcomputers and a method of information handling to provide on-line data collection and data communication between the programmable logic controller and the data processing microcomputer in a stand alone unit for control of the furnace, thus eliminating the need for higher level computers. While the method taught by the '438 patent has advantages, it is disadvantageous in that it does not provide the operator with substantially real-time data about the furnace operation that may be transmitted over both a secure local computer network and over a global computer network to a secure database so that the operator may make real-time decisions about the operation of the furnace.

What is desired, therefore, is a system and method for monitoring an electric arc furnace, wherein data may be collected and displayed on a local user's personal computer in substantially real-time and also transmitted to a remote secured database, where reports using the collected data stored in the remote secured database may later be prepared to evaluate the furnace's historical operation.

SUMMARY OF THE INVENTION

It is an aspect of the present invention to provide an improved system and method for monitoring an electric arc furnace.

It is another aspect of the present invention is to provide an improved system and method for monitoring an electric arc furnace, which process provides the operator with substantially real-time data about the furnace's operation.

It is yet another aspect of the present invention to provide an improved system and method for monitoring a primary electrical circuit of an electric arc furnace, which provides substantially real-time data that may be transmitted over a secure local network to a local operator's computer monitor.

It is another aspect of the present invention to provide an improved system and method for monitoring a primary electrical circuit of an electric arc furnace, which provides substantially real-time data that may be transmitted over a global computer network to a secure database.

Still a further aspect of the invention is to provide an improved system and method for monitoring an electric arc furnace, wherein the substantially real-time data may be collected and analyzed in reports detailing the historical operation of the furnace.

These aspects and others, which will become apparent to the artisan upon review of the following description, can be accomplished by providing a system and method for monitoring a primary electrical circuit of an electric arc furnace. The electric arc furnace comprises a known primary electrical circuit; the primary electrical circuit comprises a known primary current transformer and known primary voltage transformer. The system comprises a monitoring or metering device, which collects data about the operating parameters of the primary electrical circuit of the electric arc furnace and transmits the data to a furnace monitoring system server.

The furnace monitoring system server also collects and stores in substantially real-time information about each "heat" received from the electric arc furnace's existing programmable logic computers (PLCs) and/or through manual entry of data input at a furnace operator's personal computer, if available, both of which are connected to the furnace monitoring system server via an existing Ethernet connection.

Advantageously, the information stored in the furnace monitoring system server from all three sources (the metering device, the programmable logic computers and the manually entered data from the personal computers) is displayed in substantially real-time on the furnace monitoring viewer system.

The collected information is sent from the furnace monitoring system server to a data base on a web server, where it is stored. The collected, stored information is accessible by authorized users via a secure Internet website, using existing browser software, and accessed via a secrete password. Advantageously, this allows for the web-based generation of historical reports about the performance of the electric arc furnace as well as other customized reports, correlations and analyses that may be generated therefrom. Further, this collected, stored information may be accessed by different parties, such as both the furnace operator and the electrode supplier, who may now simultaneously view the same information and thus work together to maximize the furnace's performance.

The monitoring device, when combined with the intuitive nature of the screens and menus displayed on furnace monitoring viewer system, offers a comprehensive method to enable users to view, generate, file or print desired information about the performance of the electric arc furnace.

It is to be understood that both the foregoing general description and the following detailed description provide embodiments of the invention and are intended to provide an overview or framework of understanding of the nature and character of the invention as it is claimed. The accompanying drawings are included to provide a further understanding of the invention and are incorporated in and constitute a part of the specification. The drawings illustrate various embodiments of the invention and, together with the description, serve to describe the principles and operations of the invention.

BRIEF DESCRIPTION OF THE DRAWINGS

The structure and preferred embodiments of the invention can best be understood by reference to the accompanying drawings, in which.

DETAILED DESCRIPTION OF THE PREFERRED EMBODIMENT

Figure 1:
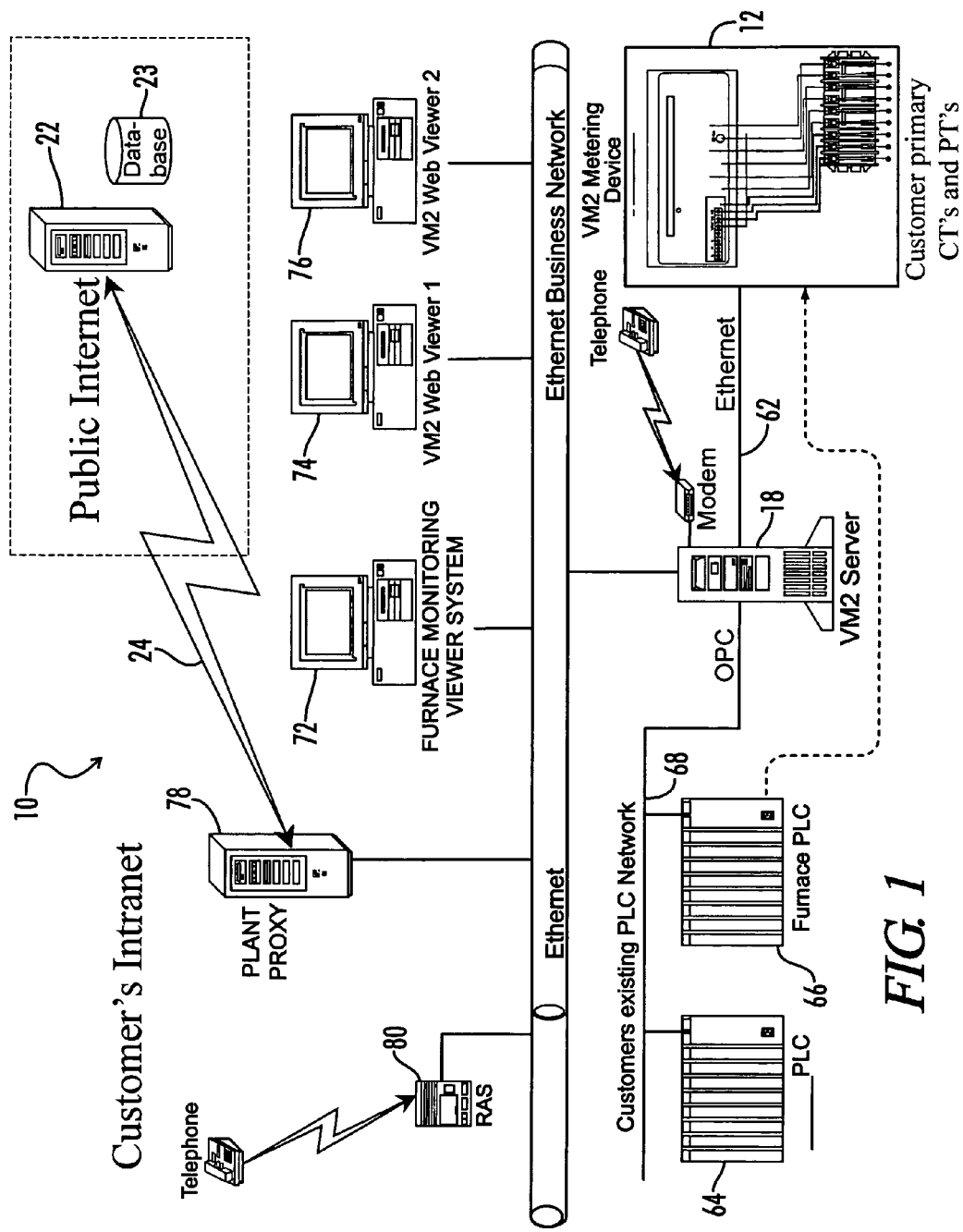
FIG. 1 is a schematic drawing of an electric arc furnace having a metering device operatively connected thereto, in accordance with the present invention.

A system for monitoring an electric arc furnace constructed in accordance with the present invention is generally shown in FIG. 1 and designated by the reference numeral 10. The monitoring system 10 generally comprises a monitoring device 12 for collecting data about the primary electrical circuit 14 of an electric arc furnace 16; a furnace monitoring system server 18, sometimes referred to as a melt shop server, operatively connected to the furnace monitoring device 12 for receiving the collected data; a furnace monitoring viewer system 72, operatively connected to the furnace monitoring system server 18, for displaying in substantially real-time the collected data; and a web server 22 having a remote secured database 23, operatively connected to the furnace monitoring system server 18, for storing the collected data, where it is accessible by authorized users via the Internet 24 on a secure Internet website.

Figure 2:
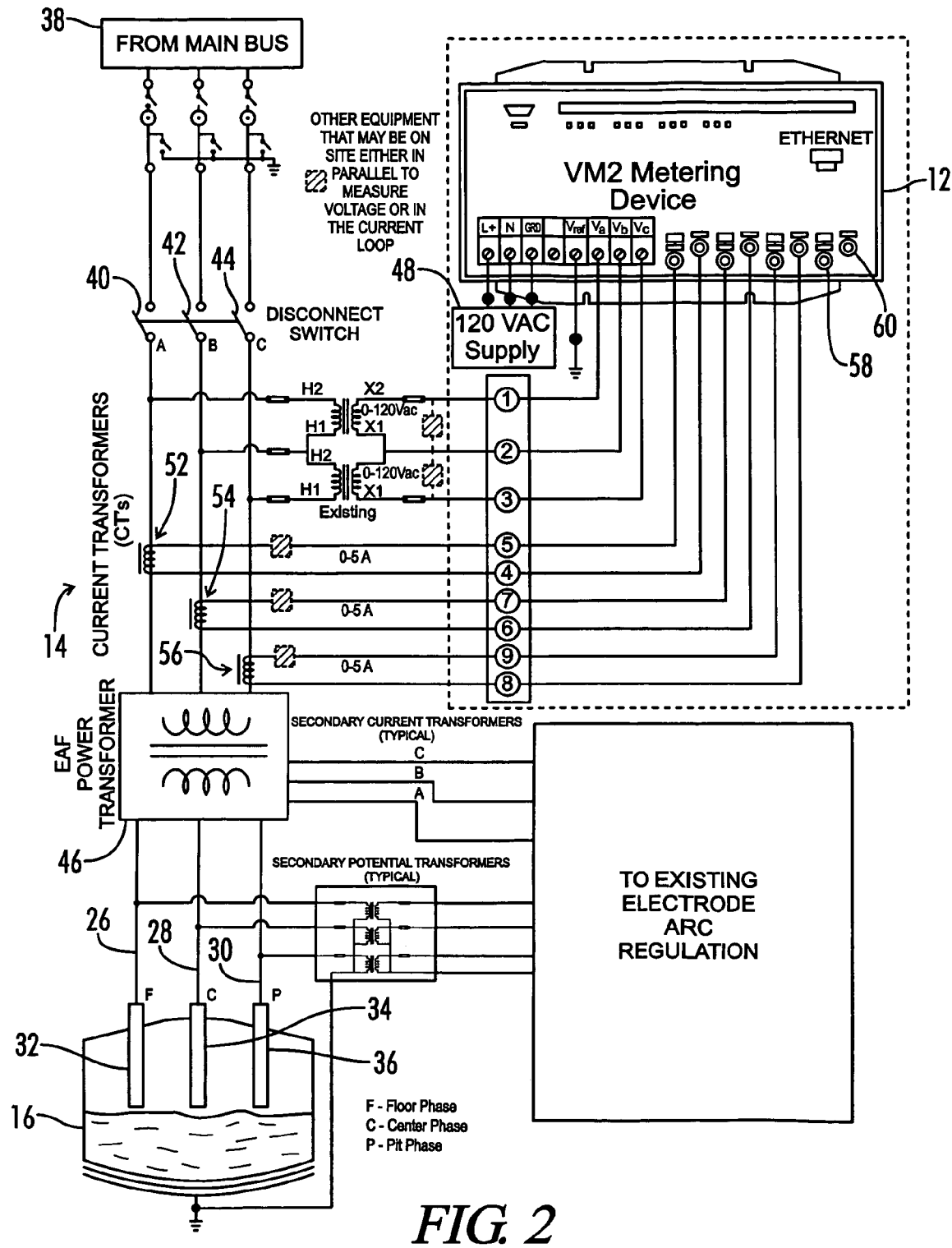
FIG. 2 is a schematic drawing of a meter operatively connected to a primary current transformer of the electric arc furnace of FIG. 1.

Referring in detail to FIG. 2, a conventional AC electrothermal furnace or electric arc furnace (EAF) is shown and designated by the reference numeral 16. As is known, most melt shop AC electric arc furnaces 16 are powered by 3-phase power lines 26, 28, 30 carrying about seventy thousand amps or more of current. Conventionally, one phase 26 is deemed the floor phase, one phase 28 is deemed the center phase; and one phase 30 is deemed the pit phase.

In the steel industry, graphite electrode columns 32, 34, 36 are sometimes used in these electrothermal furnaces 16 to melt metals and other ingredients to form steel. The heat needed to melt metals is generated by passing current through one or more of the electrode columns 32, 34, 36 and forming an arc between the electrode column(s) and the metal in the furnace. Electrical currents in excess of 100,000 amperes are often used. The resulting high temperature melts the metals and other ingredients.

Referring again to FIG. 2, as is known, current traveling to each electrode column 32, 34, 36 travels from the main bus 38. For safety reasons, known electric arc furnaces 16 have one disconnect switch per phase 40, 24, 44 to automatically disconnect the power supply, as desired.

A EAF power transformer 46 is positioned between the disconnect switches 40, 42, 44 and the three electrode columns 32, 34, 36 that are positioned in the furnace 16. As is know, the power transformer 46 takes the high voltage/low current coming into the furnace 16 and steps it down to low voltage/high current suitable to provide the high amperage needed to pass through the electrode columns 32, 34, 36 to melt the steel. In viewing FIG. 2, it should be understood that based on the orientation thereof, the "primary" side of the furnace's electrical circuit refers to the voltage lines, switches, etc. that are positioned "above" the EAF power transformer 46 (see ref. numeral 14); in contrast, anything positioned "below" the EAF power transformer 46 is deemed to be on the "secondary" side.

The furnace monitoring device 12, sometimes referred to as a metering device, is connected on the primary side 14 of the furnace's electrical circuit and thus collects data about electrical parameters about the electric arc furnace 16 primary electrical circuit 14. Any suitable metering device may be used, but preferably the monitoring device is that one sold by Electro Industries under the mark Nexus 1250.

More specifically, referring to FIG. 2, the monitoring device 12 is preferably connected as follows when connected to an AC furnace 16 having a common "delta" configuration, such as the furnace shown. Terminals L+, N and GND are connected to a 120 V AC power supply 48. Terminal Vref is connected to ground. Terminal Va is connected to the existing primary potential transformer 50 to the floor phase line 26. Terminal Vb is connected to the primary potential transformer 50 to the center phase power line 28. Vc is connected to the primary potential transformer to the pit phase line 30.

Continuing to read the meter 12 connections from left-to-right, the remaining terminal pairs connect to the primary side current transformers as follows. Terminal pairs 5, 4 connect to the primary current transformer 52 on the floor phase 26; terminal pairs 7, 6 connect to the primary current transformer 54 on the center phase 28; and terminal pairs 9, 8 connect to the primary current transformer on the pit phase line 30.

There are less common but known electric arc furnaces that are configured, not in a "delta" configuration as described above, but rather in a "Y" configuration (not shown). When a customer's furnace is configured in this known "Y" configuration, it is necessary to use the remaining two terminals 58, 60 of the metering device 12 to connect to a primary current transformer of the leg having the combined voltage lines.

Referring to FIG. 1, the furnace monitoring device 12 is operatively connected via the user's existing Ethernet 62 to the furnace monitoring system server 18. Thus, the data collected about the primary electrical circuit by the meter 12 is transmitted via Ethernet 62 to the furnace monitoring system server 18.

Existing programmable logic controllers (PLCs), such as 64, 66, provide process information, or data, abut each "heat,"

such as times, oxygen and natural gas consumption, process weights, temperatures and end-of-heat signals. The existing PLCs 64, 66 are operatively connected to the furnace monitoring system server 18 via the user's existing PLC network 68 or Ethernet and transmit data about each "heat" to the furnace monitoring viewer system 72, which is sometimes referred to as a melt shop viewer system.

Additionally, data about the operation of the furnace 16 may be entered manually by a user operating the furnace monitoring viewer system, such 72, operatively connected via Ethernet 62 to the furnace monitoring system server 18.

The furnace monitoring viewer system 72 sometimes referred to as a real-time screen, displays in substantially real-time the data received by the furnace monitoring system server 18 from the meter 12, the PLCs 64, 66 and entered manually from the furnace monitoring viewer system 72. As such, the real-time screen of the furnace monitoring viewer system 72 allows the user to monitor the current activities of the furnace 16. The real-time data may be sent via Ethernet 62 to other personal computers, if desired, where it may be received, and, if desired, displayed on a monitor operatively connected thereto 74, 76.

Advantageously, the furnace monitoring system server 18 combines electrical data from the monitoring device 12, process information from the existing PLCs 64, 66 and manually entered data into a comprehensive data, acquisition, storage and retrieval system.

Advantageously, the furnace monitoring viewer system 72 allows a user to view some current operating parameters of the electric arc furnace 16 in substantially real time, including operating trends, historical trends, statistical tables and graphical representations. The data collected from the monitoring or metering device 12 may be presented in various formats to the viewer to better assist the viewer in evaluating the real-time data. For example, a "real time overview" format displays the present values of the parameters measured. Additionally, a "heat summary" format displays the actual heat status of the furnace.

Collected data is stored in the furnace monitoring system server 18, encrypted via known encryption programs, then sent at the end of each heat, or at other predetermined times, via the user's existing proxy server 78. The user's proxy server 78 then pushes the encrypted collected data over the Internet 24 to a remote secured data base 23 on a web server 22. Optionally, a modem line (not shown) may be used in the to operatively connect the furnace monitoring system server 18 to a local Internet service provider.

The web server 22 receives all the data sent at the end of each heat and stores it in the remote secured database 23. Known Internet browser software, such as Microsoft Explorer or Netscape Navigator, can access the database 23 and generate the heat analysis reports, correlations and other analyses. The reports, correlations and other analyses are accessible to users using existing browser software and logging in via a secret password to a secure virtual site. From the web server 22, authorized users may view reports detailing the historical operation of the furnace. These reports include, for example, a single heat summary, a daily heat summary, daily shift heat summary, weekly heat summary, monthly heat summary, heat summary by date range and conditions, performance reporting in graphical format, refractory wear reporting, event log reporting, electrode consumption reporting, and electrode usage and inventory reporting.

Advantageously, the present invention 10 thus allows furnace operators to view simultaneously both real time data and historical performance data. Prior known data collecting and processing devices have not allowed the user the ability to see both real-time data and historical data.

Server 80 allows technicians to access the system remotely for the purposes of service and support only.

A method for monitoring the electric arc furnace 16 generally comprises the steps of automatically monitoring via meter 12 the electric arc furnace 16, including collecting data about at least one primary current transformer such as 52, 54, 56 of the primary electrical circuit 14 of monitored electric arc furnace 16; transmitting the collected data to a furnace monitoring system server 18 having an operatively connected furnace monitoring viewer system 72; and displaying the collected data on the furnace monitoring viewer system 72 in substantially real-time.

Additionally, the furnace monitoring system server 18 collects information about the performance of the electric arc furnace 16 from at least one programmable logic computer, such as 64, 66, operatively connected to the furnace monitoring system server 18 and displays the collected performance information on the furnace monitoring viewer system 72.

The furnace monitoring system server 18 also collects information entered manually by an operator on an input device, such as the furnace monitoring viewer system 72, operatively connected to the furnace monitoring system server 18, and displays the manually entered information on the furnace monitoring viewer system. The server 18 also collects pertinent chemical data it receives.

The collected data, the manually entered information and the collected performance information are then encrypted, transmitted to an existing proxy server and then transmitted via the Internet to the remote database 23 on the web server 22. The collected data, the manually entered information and the collected performance information can then be manipulated by users to generate historical reports about the electric arc furnace 16. Then, after evaluating the historical reports, the furnace operator may change at least one of the predetermined operating parameters of the primary electrical circuit in response thereto.

The furnace monitoring system 10 uses state of the art hardware and software to record the full range of operational parameters, including chemical ones, which make up the total operating environment of the electric arc furnace. The present invention provides on-line, real time access through a standard Internet browser secured with modern encryption technology that enables the operator to increase electric arc furnace and melt shop productivity; reduce costs; recognize opportunities to improve operations proactively; measure and analyze shop parameters continuously and to more consistently reduce variability continuously.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method for monitoring an electric arc furnace having a monitoring device, programmable logic controller and a furnace monitor viewing system, the method comprising the steps of:

provliding a furnace monitoring system server;

receiving at the furnace monitoring system server electrical data from the monitoring device correlating to electrical parameters of input power to the electrical arc furnace;

receiving, at the furnace monitoring system server, process data transmitted from the programmable logic controller correlating to at least one of heat time, oxygen and natural gas consumption, process weights, temperatures and end-of-heat signals;

receiving at the furnace monitoring system server furnace operation data entered manually by an authorized user;

displaying the received electrical data, process data, and manually entered operation data for viewing in substantially real-time by a user;

transmitting at predetermined intervals the electrical data, process data and manually entered operation data from the furnace monitoring system server to a web server and storing the transmitted data in a remote database located on the web server; and accessing the remote database via the Internet and generating a report detailing historical operation of the furnace, the report including the manually entered operation data, wherein the report includes a plurality of:

performance reporting in graphical format, refractory wear reporting, event log reporting, electrode consumption reporting, electrode usage and inventory reporting, and information about furnace heats collected according to any or all of single heats, daily heats, daily shift heats, weekly heats, monthly heats, heats by date range and conditions.

2. The method of claim 1, wherein the electrical parameters of the input power to the electric arc furnace comprises a current on the primary side of a primary current transformer.

3. The method of claim 1, wherein said report is generated using the stored electrical data, process data and manually entered operation data.

4. The method of claim 1, wherein said step of displaying the received electrical data, process data, and manually entered operation data is performed at the furnace monitor viewing system.

* * * * *